W. A. STEWART.
ICE PICK.
APPLICATION FILED JUNE 12, 1914.
1,136,561.                                     Patented Apr. 20, 1915.
Fig. 1.                                        Fig. 2.
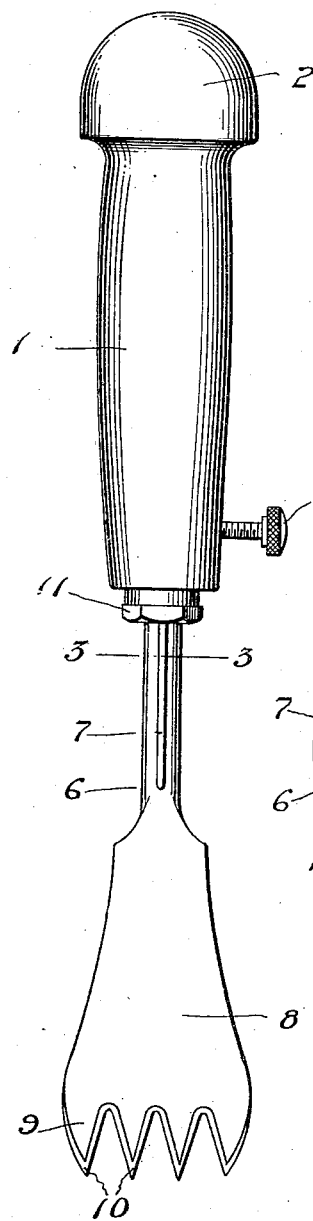
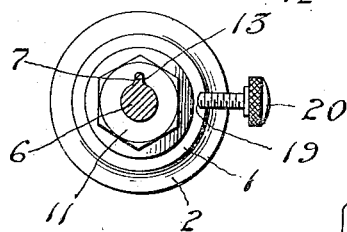
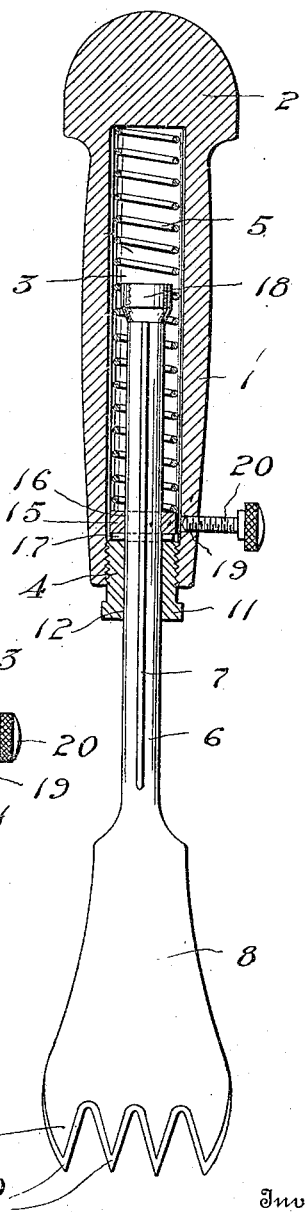
Witnesses
Paul M. Hunt.
Wm. H. Downing.
Inventor
William A. Stewart.
By Richard B. Owen.
Attorney

UNITED STATES PATENT OFFICE.

WILLIAM A. STEWART, OF MADISON, WISCONSIN.

ICE-PICK.

1,136,561.  Specification of Letters Patent.  Patented Apr. 20, 1915.

Application filed June 12, 1914. Serial No. 844,730.

*To all whom it may concern:*

Be it known that I, WILLIAM A. STEWART, a citizen of the United States, residing at Madison, in the county of Dane and State of Wisconsin, have invented certain new and useful Improvements in Ice-Picks, of which the following is a specification.

My invention relates to an ice pick.

The primary object of my invention resides in the provision of a blade having novel means resiliently associated with the shank thereof for imparting a jar to the shank when the blade is disposed upon the ice for breaking the ice.

Another object of my invention resides in the provision of a novel means associated with the shank and handle for preventing rotation of the shank in the handle.

A further object of my invention resides in the provision of an improved means removably carried by the handle and associated with the controlling means or collar mounted on the shank for preventing reciprocatory movement of the handle on the shank when it is desired to use the pick in the well known manner especially when shaving the ice.

A still further object of my invention resides in the provision of a device of the character described that is simple in construction, efficient in operation, and one that can be manufactured and placed upon the market at a minimum cost.

Other objects as well as the nature, characteristic features and scope of my invention will be more readily understood from the following description taken in connection with the accompanying drawings and pointed out in the claims.

In the drawings:—Figure 1 is a front elevational view of my invention. Fig. 2 is a front elevational view of the blade showing the handle and the means for retaining the shank in the handle in section. Fig. 3 is a transverse sectional view taken on line 3—3 of Fig. 1 looking toward the top of the handle.

Referring more particularly to the drawings in which similar reference numerals designate corresponding parts throughout the different views, I provide a handle 1, the upper end of which is enlarged and rounded as at 2, the handle being further provided from its lower edge with a centrally disposed longitudinally extending recess 3, the outer end of which is provided with screw threads 4, and which recess has a coil spring 5 disposed therein, for the purpose to be hereinafter described. The cutting element on which the handle 1 is reciprocally mounted in this instance consists essentially of a shank 6 having a longitudinally extending rib 7 formed thereon the lower end of which shank is enlarged to provide a blade 8, the sides of which diverge and the outer end of which shank is provided with a plurality of teeth 9, the latter being beveled as at 10 for facilitating the cutting of the ice. The shank has a jam nut 11 slidably mounted thereon by means of a central opening 12 and a longitudinally extending groove 13 provided on the periphery of the recess and which nut is provided on its outer periphery with screw threads 14 for engagement with the screw threads 4 of the handle for removably securing the shank to the handle. The shank has also slidably mounted thereon a collar 15 by means of an opening 16 and a longitudinally extending groove provided on the inner periphery of the opening for engagement with the shank. In order to limit the movement of the collar 15 on the shank, I have passed a pin 17 transversely through the shank at a point substantially intermediate the ends thereof. When the shank is disposed within the recess 3 as shown in Fig. 2 the coil spring 5 disposed within the recess bears against the collar 15 and at all times tends to force the same outwardly, the outer movement of which is limited by the pin 17 bearing against the inner end of the nut 11.

In order to facilitate the operation of the handle on the shank and at the same time allow for the removal of the nut 11 of the collar 15 from the shank, I have screw-threaded on the extreme inner end thereof an enlarged head 18 the upper surface of which forms an efficient surface for contacting with the inner end of the recess when the handle is being operated upon the shank.

When it is desired to use the ice pick for shaving the ice or as a rigid structure, and in order to prevent the sliding movement of the handle 16 upon the shank I have positioned an opening 19 through the lower end of the handle adjacent the screw threads 4 and have removably mounted in the same a set screw 20 the inner end of which bears against the outer surface of the collar 15 and the frictional engagement caused by this operation prevents the sliding movement of the parts.

The operation of my device is as follows:—When it is desired to break a piece of ice the blade 10 is placed upon the ice at the desired place and the handle is forced downwardly against the tension of the spring 5 and the inner end of the recess is brought into engagement with the head 18 of the shank, the jar or knock imparted in this manner is transmitted by the blade to the ice and when the slight pressure is removed the coil spring 5 which bears against the recess and collar forces the shank upwardly whereupon this operation is repeated until the ice is severed. During this operation it would not be amiss to direct special attention to the fact that the somewhat elongated nut having the recess and groove therein which correspond in cross section to the contour of the shank arranged in close arrangement with the outer surface thereof and tend to guide the handle upon the shank and prevent lateral movement thereof as well as preventing the rotation of the blade.

Although I have shown and described the preferred embodiment of my invention I desire to be understood and I am not limited to the exact details shown, however, I desire that stress be laid upon the arrangement of the shank having the rib and the nut having the opening, the nut being removably secured in the handle for the purposes set forth. It can also be seen that by the arrangement of the head the parts if broken can be easily and quickly disassembled and new parts replaced at a cheaper cost.

From the above description taken in connection with the accompanying drawings, it can easily be seen that I have provided a device that is simple in construction containing but a few simple parts that can be cheaply manufactured and assembled and when assembled can be placed upon the market and sold at a minimum cost.

Having thus fully described my invention what I claim as new and desire to secure by Letters Patent is:—

1. An ice pick including a shank having a longitudinal rib thereon, a handle reciprocably and removably associated with the shank, a collar on the shank provided with an opening similar in contour to the outer surface of the shank and rib, resilient means associated with the shank handle and collar for normally maintaining said handle in spaced relation with the shank, and means on the shank for limiting the downward movement of the collar on the shank.

2. An ice pick including a handle provided with a longitudinally extending recess, a coil spring disposed in said recess, a shank having a longitudinally extending rib thereon disposed in said recess, a jam nut provided with an opening similar in contour to the outer surface of the shank for sliding engagement with the shank and for removable engagement with the recess, a collar on the shank provided with an opening similar in contour to the outer surface of the shank for sliding engagement with the shank and for contacting with one end of the spring, means for limiting inward movement of the collar on the shank, a head removably secured to the inner end of the shank for contacting with the inner end of the recess, and means carried by the handle for removable engagement with the collar on the shank for preventing a sliding movement of the parts.

3. An ice pick including a handle provided with a longitudinally extending recess, a coil spring disposed in said recess, a shank having a longitudinally extending rib thereon disposed in said recess, a jam nut provided with an opening similar in contour to the outer surface of the shank for sliding engagement with the shank and for removable engagement with the recess, a collar on the shank provided with an opening similar in contour to the outer surface of the shank for sliding engagement with the shank and for contacting with one end of the spring, means for limiting inward movement of the collar on the shank, and a head removably secured to the inner end of the shank for contacting with the inner end of the recess.

4. An ice pick comprising a handle provided with a longitudinally extending recess, said recess being provided with screw threads adjacent the outer end thereof, a coil spring disposed in said recess, a shank having a longitudinally extending rib thereon disposed in said recess, a nut provided with a central opening and a longitudinal groove on the inner periphery of the opening for sliding engagement with the shank and for screw-threaded engagement with the recess, a collar on the shank provided with a central opening and a longitudinal groove on the periphery of the opening for sliding engagement with the shank and for engagement with one end of the coil spring, a pin for limiting the outward movement of the collar on the shank, and a head removably secured to the inner end of the shank for contacting with the inner end of the recess.

In testimony whereof I affix my signature in presence of two witnesses.

WILLIAM A. STEWART.

Witnesses:
 FRED GEISEN,
 GEO. A. GUSSMAN.